United States Patent [19]

Doke

[11] 3,999,352
[45] Dec. 28, 1976

[54] WALL SECTION MODULE

[75] Inventor: Jack Doke, Diamond Bar, Calif.

[73] Assignee: Angeles Metal Trim Co., Los Angeles, Calif.

[22] Filed: July 8, 1974

[21] Appl. No.: 486,628

Related U.S. Application Data

[62] Division of Ser. No. 364,295, May 29, 1973, abandoned.

[52] U.S. Cl. .................... 52/690; 52/481; 403/282; 403/283
[51] Int. Cl.$^2$ .................. E04C 3/02; F16B 9/00
[58] Field of Search .............. 52/753 J, 481, 281, 52/758 D, 482, 690; 403/232, 282, 283

[56] References Cited

UNITED STATES PATENTS

| 1,574,304 | 2/1926 | Pawling | 52/334 X |
| 3,082,850 | 10/1974 | Weening | 52/758 D X |
| 3,083,794 | 4/1963 | Stovall, Jr. | 52/758 D X |
| 3,539,669 | 5/1970 | Plemeng | 52/499 X |
| 3,841,043 | 10/1974 | Zinn | 52/481 X |

Primary Examiner—Ernest R. Purser
Assistant Examiner—Carl D. Friedman
Attorney, Agent, or Firm—Reed C. Lawlor

[57] ABSTRACT

A prefabricated sheet metal wall module comprises: an upper horizontal cap member of inverted U-shaped cross-sectional configuration with a pair of parallel longitudinal dependent side flanges; a lower horizontal floor track member of U-shaped cross-sectional configuration with a pair of parallel upwardly extending longitudinal side flanges; and a series of parallel upright studs each having a pair of opposite longitudinal side flanges. The upper and lower ends of each stud telescope into the upper and lower horizontal members respectively with the side flanges of the stud in intimate surface contact with the side flanges of the horizontal members thereby providing four rectangular areas of two layers of metal. With a stud in assembled position under compression between the associated horizontal members, a power-actuated hand tool having a pair of jaws equipped with a hollow die and a cooperating punch, respectively, is applied at each juncture of a horizontal member with a stud of metal at each juncture to punch interlocking hyperboloidal crimps in the two overlapping layers resulting in prestressed joints that make the wall module rigid enough to carry to a construction site where wall modules are assembled to form a low-cost building.

12 Claims, 13 Drawing Figures

WALL SECTION MODULE

INTRODUCTION

This application is a division of copending application Ser. No. 364,295, filed May 29, 1973, now abandoned.

This invention relates to an improved arrangement fastening together intersecting members of a metal wall section, particularly such sections that are in the form of modules that are prefabricated at a prefabrication station and are carried to a construction site where the modules are assembled to form a building, particularly a low-cost residence.

CROSS REFERENCES TO RELATED APPLICATIONS:

U.S. Pat. application Ser. No. 35,648, filed May 8, 1970.
U.S. Pat. application Ser. No. 467,247, filed Nov. 1, 1973.
U.S. Pat. application Ser. No. 412,043, filed Nov. 1, 1973.
U.S. Pat. application Ser. No. 412,041, filed Nov. 1, 1973.
U.S. Pat. application Ser. No. 412,044, filed Nov. 1, 1973.
U.S. Pat. application Ser. No. 412,042, filed Nov. 1, 1973.
U.S. Pat. application Ser. No. 364,293, filed May 29, 1973.
U.S. Pat. application Ser. No. 364,294, filed May 29, 1973.

BACKGROUND OF THE INVENTION

In the prefabrication of a sheet metal wall module of the character to which the present invention pertains, a series of parallel studs with pairs of parallel longitudinal side flanges are telescoped at their upper ends into an upper horizontal cap member having a pair of parallel longitudinal dependent side flanges and at their lower ends into a lower horizontal floor cap member having a pair of parallel longitudinal upright side flanges. Thus, the side flanges of each stud are in intimate surface contact with the side flanges of the upper and lower horizontal members so that there are two rectangular areas of two layers of sheet metal at each juncture of a stud with a horizontal member. The metal studs normally simulate wooden 2×4 units, thus having webs about 3-⅝ inches wide and flanges about 1-⅝ inches wide. The studs are preferably of C-shape though they may be of other non-planar configuration. The cap members and track members also normally simulate 2×4 wooden members, thus also having webs with widths of about 3-⅝ inches and flanges having widths of about 1-¼ inches. The cap and track members, however, are normally of U-shape.

Different expedients have been employed heretofore to join the longitudinal flanges of the studs to the longitudinal flanges of the two horizontal members at each juncture to result in an acceptably rigid wall module. For example, various fastener elements have been employed including sheet metal screws and blind rivets. In each instance, such a fastener element necessarily protrudes beyond the outer surface of a corresponding longitudinal flange of an upper or lower longitudinal member and to that extent interferes with the fastening of sheet material to finish a building wall. In addition, it is necessary to provide a supply of fastener elements and to take time to handle them.

There has been a pressing need for a sheet metal joint for use in a prefabricated metal sheet wall module that eliminates the need for using such fastening elements. This need might be achieved by utilizing a crimping system such as that disclosed in British Pat. No. 145,380 or U.S. Pat. No. 3,010,199, or U.S. Pat. No. 3,320,843. In fact, tools that have heretofore been on the market, have been employed to produce crimps like that shown in British Patent No. 145,380 at the junctures of studs and horizontal members of wall sections. Such operations, however, have been performed on site and as far as is known, have not been successfully applied to the prefabrication of wall section modules that are to be transported from a prefabrication station to the construction site.

SUMMARY OF THE INVENTION

In this invention, a particular type of crimp joint is formed by a crimping, or staking, operation at the junctures of the prefabricated wall sections while the components of the prefabricated wall sections are held together under compression. The wall section modules so formed provide a module of sufficiently rigid construction to facilitate its being readily carried to a construction site and there assembled. Even though the crimp joint per se may not be as strong as a conventional fastener such as a screw or a rivet, the required strength for the final wall is achieved by the installation of gypsum board or other sheeting material in place to form the completed wall of the residence and the precompressed condition holds the studs in firm contact with the cap member and the track member, thus making it unnecessary for the crimp joint itself to be strong enough to support any substantial part of the vertical load to which the studs are subjected. While such precompression effects have existed heretofore when using screws or rivets, advantage is now taken of those effects to permit the use of crimp joints. By using a crimp joint of the type described herein, a less expensive but satisfactory prefabricated module is made available without dangerous reduction of strength of the final wall structure in which it is incorporated.

The invention employs a particular crimp joint to interconnect the longitudinal flanges of the sheet metal studs and the longitudinal flanges of the upper and lower horizontal members of a prefabricated wall module. This particular crimp joint has been employed for other purposes prior to the date of conception of the present invention but the present invention resides in the discovery that all of the various potential advantages of that crimp joint may by fully utilized for the first time to hold vertical studs in place between a cap member and a track member of a sheet metal wall module.

In the fabrication of such a crimp joint in the present invention, a die having a cavity is placed inside a stud against the inner surface of a longitudinal side flange of the stud and a punch is placed in register with the die against the outer surface of the longitudinal side flange of an associated upper or lower longitudinal member of the wall module. Then the die and punch are squeezed together to cause the punch to form a pair of concurrent or aligned apertures in the two layers of sheet metal with interlocking tongues extending from the periphery of the aperture in a direction about perpendicular to the two layers of sheet metal and inwardly into the interior of the stud. Though crimps having tongues of that configuration have been employed heretofore to fasten two sheet metal parts together, they have not, so far as is known, been employed to fasten together two perpendicularly intersecting members of a wall section module of the type described to hold them together under compression.

The tongues employed in the present invention are of special configuration, and unlike those employed heretofore in fastening two intersecting members of a wall structure together, extend generally transversely or perpendicularly to the surface of the sheets fastened together rather than generally parallel to or folded back onto those sheets and are curved and have greater widths at their outer ends than they do at their roots where they are joined to the sheets that are crimped together. The cross-sections of the tongues in a plane parallel to the surfaces of the sheet metal members fastened together, are of outwardly concave generally hyperbolic configuration and adjacent tongues formed from the two pieces of sheet metal are nested together in contacting interlocking fashion. The sharpness of curvature of the hyperbolic cross-sections gradually increases with the distance from the fastened surfaces thereby forming a tightly interlocked pair of tongues that are restrained from relative movement in any direction, either parallel to or transverse to the axis of the apertures. Furthermore, the outer ends, or corners of the tongues, remote from the members fastened together, lie outside or beyond the edge or projection of the aperture. The tongue may be described as being of hyperboloidal configuration.

The special synergistic relation of such a crimp joint to the specific structure of a sheet metal wall module of the character described, may be appreciated by considering various advantages of the new combination.

The most important advantage lies in the fact that such crimp joints may be employed to provide portable lower cost wall modules while still meeting standard building requirements for the ultimate strength of the walls formed in housing in which they are assembled.

A further advantage, of course, lies in the elimination of need for stocking and handling separate fastener elements.

An important advantage lies in the fact that the time required to form the crimp joints in a prefabricated wall section module is reduced, compared with the time required when the joints are formed with the aid of screws or rivets, thereby reducing the cost of manufacture of wall structures, a very important consideration in low-cost housing construction.

A still further advantage of the invention resides in the fact that the projecting heads of screws and rivets are eliminated, thus facilitating flat engagement of wallboard or other material with the outer surfaces of the wall sections.

Another advantage resides in the fact that the tongues so formed lie within the interior of the wall section in a location where the sharp edges of the tongues provide very little hazard to workmen who handle the wall section module. Commonly, the studs of sheet metal wall module are C-shaped in cross-sectional configuration with inwardly turned stiffening lips formed at the edges of the side flanges of the studs. As a result, in such a structure the stiffening lips of the studs make the extended tongues of the crimped joints even less accessible. Such stiffening lips of the studs aid in reducing the hazards to workmen.

To produce the prestressed joints, care is taken that the opposite end edges of each stud are perpendicular to the longitudinal axis of the stud and are squarely seated in pressure contact with the main web of the upper and lower horizontal members respectively. The crimp joints at the opposite ends of the stud are formed while the assembly is preloaded in this manner and the crimp joints have such inherent effectiveness against relative movement that the crimp joints effectively capture the prestressing forces and maintain the prestressing in the resultant modules and in the finished wall of a building.

In a sheet wall module of the present construction, crimping is performed at a point midway between the edges of the longitudinal side flanges of the studs and less than about one inch from the web of the horizontal C-shaped member, into which the stud is pressed. The forming of the crimp is performed by means of a pair of cooperating jaws of a power-actuated hand tool, the hollow die being carried by one jaw and the cooperating punch being carried by the other jaw.

It is a simple matter to design such a pair of jaws with the desired reach and, moreover, to shape the jaws to straddle and clear a stiffening lip of a longitudinal side flange of a sheet metal stud. Employing such a tool makes it possible to fabricate a crimp joint in prestressed sheet metal in an operation of less than about one second duration and thus minimizes the cost of shop assembly of a prefabricated sheet metal wall module.

The present invention is based on the discovery that within the limitation imposed by the width dimension of a side flange of a stud, it is possible to fabricate a crimp joint that is of adequate strength as a joint per se without unduly lowering the strength of the stud itself. It has been found that if the diameter of the aperture is substantially less than 3/8 inch, the crimp joint itself is too weak and on the other hand, if the cross-dimension substantially exceeds 3/8 inch, the stud itself is unduly weakened. In the best practice of the invention wherein the inside diameter of the die cavity is approximately 7/16 inch and wherein the area of the aperture produced by a punch exceeds the cross-sectional area of the punch, it has been found that the aperture is too large if the diameter of the punch is substantially greater than about 5/16 inch and the diameter of the aperture is too small if the diameter of the punch is substantially less than about 3/16 inch.

DRAWINGS

The various features and advantages of the invention may be understood from the following detailed description and the accompanying drawings.

GENERAL DESCRIPTION

Outline

In the following description, the actual assembly of the prefabricated wall sections of this invention in a house is first described. Then, typical wall section modules made in accordance with the invention are described. And finally, the crimping system is described in some detail.

House Assembly

Figure 1:
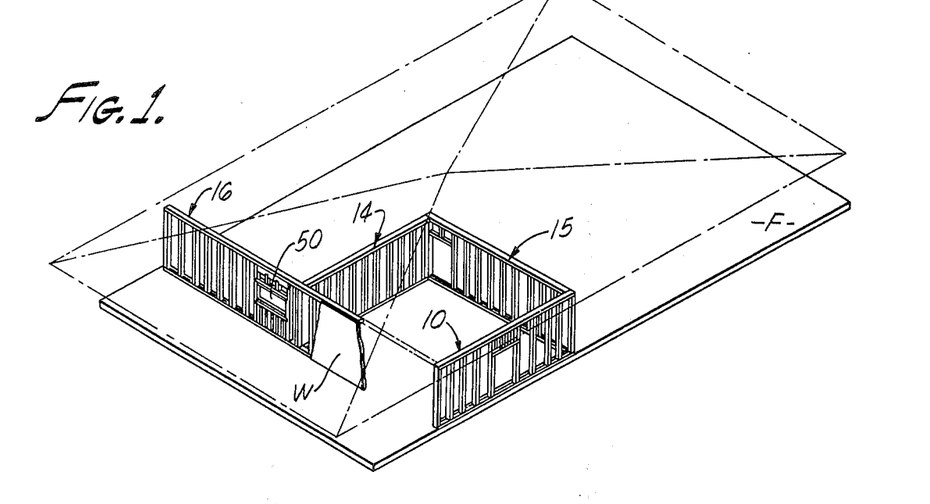
FIG. 1 is a perspective view of a part of a residential home during construction showing part of the framing of the house that incorporates the present invention.

FIG. 1 is a perspective view of a typical residential house which has been partially framed with a framing system incorporating this invention. The load-bearing wall section module 10 and non-load-bearing wall section modules 14, 15, and 16 are shown in some detail. Wall section modules 10, 14, 15 and 16 that have been prefabricated in accordance with this invention at a plant remote from the building construction site, are transported to the building construction site by truck. Wall section modules 10, 14, 15 and 16 are then carried by hand from the truck, stood up on the house floor F, and held in standing position while they are secured to the floor F and to each other. A superstructure, such as a roof, is mounted so that the load per unit length applied to the load-bearing modules is greater than the load per unit length supplied to the non-load-bearing modules.

Wall section modules 10, 14, 15, and 16 are typically 16 or 20 feet in length and 8 to 10 feet high. In the best embodiment of the invention, the wall section modules are 16 feet long, 8 feet high, and about 3⅝ inches wide, and they are made of steel members that simulate 2×4 wooden members. Such a wall section module is easily handled by three men.

If the floor F of the house consists of a concrete slab, the wall section modules may be secured to the floor slab in a well-known manner by shooting pins through suitable washers and through the webs of the sheet metal floor track members of the wall section modules into the concrete floor slab. If the floor F is wooden, the wall section modules may be secured to the floor F by nailing through the webs of the bottom cap members of the wall section modules. The wall section modules are then suitably secured to adjacent wall section modules, and wallboard W is secured to the wall section module by screws 19 or other suitable fasteners (see FIG. 2).

Wall Section Modules

Figure 2:
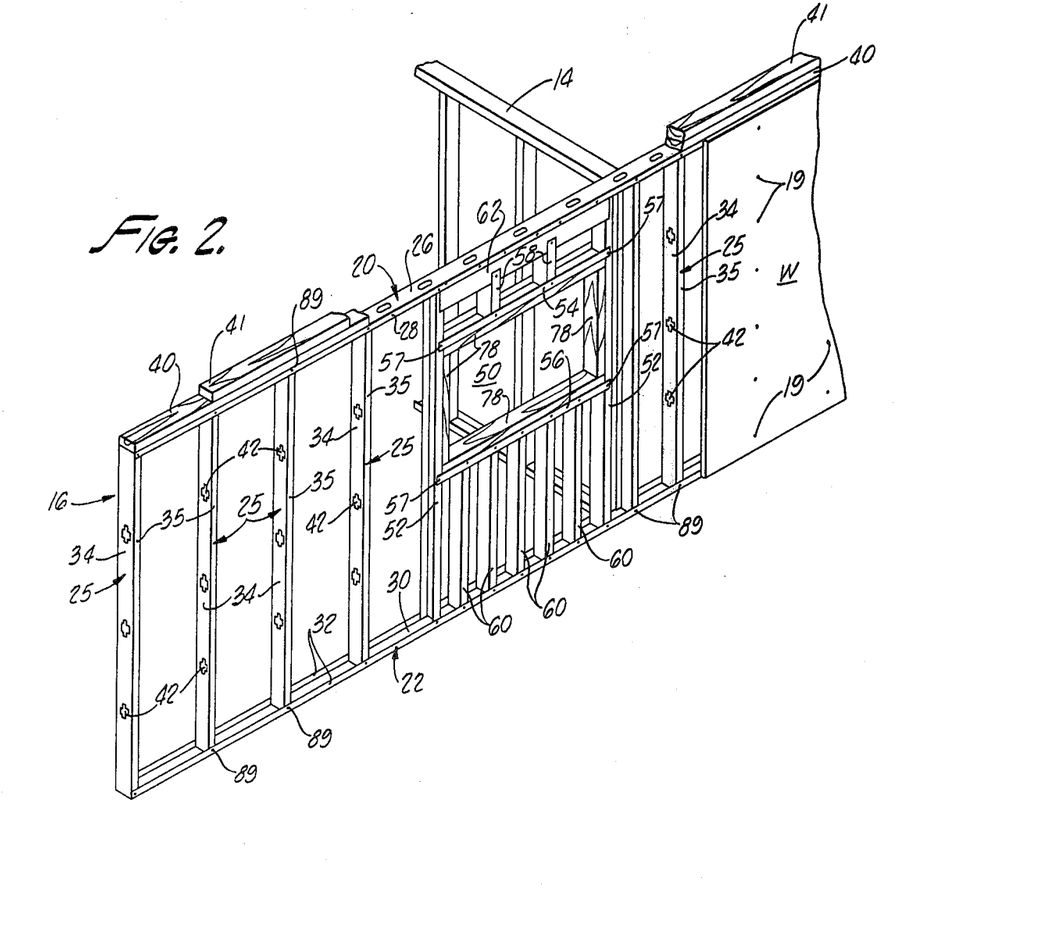
FIG. 2 is a perspective view of a pair of wall section modules in the framing shown in FIG. 1.

FIG. 2 shows wall section modules 16 in greater detail. Wall section module 16 is composed of a downwardly facing elongated channeled cap member 20, which provides the top of the wall section module 16, and upwardly facing elongated channeled floor track member 22, which provides the bottom of the wall section module 16. Cap member 20 and floor track member 22 are positioned horizontally above and below metal studs 25 respectively and, in the illustrated embodiment of the invention, are both about 20 feet in length. The cap member 20, the floor track member 22, and the studs 25 may all be made of 26-gauge galvanized steel both in the non-load-bearing walls and in the load-bearing walls.

The top cap member 20 and the lower track member 22 are typically U-shaped channeled metal members. Cap member 20 has an elongated main web 26 and downwardly depending longitudinal side flanges 28 integral with the main web 26. Floor track 22 has an elongated main web 30 and upstanding flanges 32 extending longitudinally of and integral with the main web 30.

Figure 3:
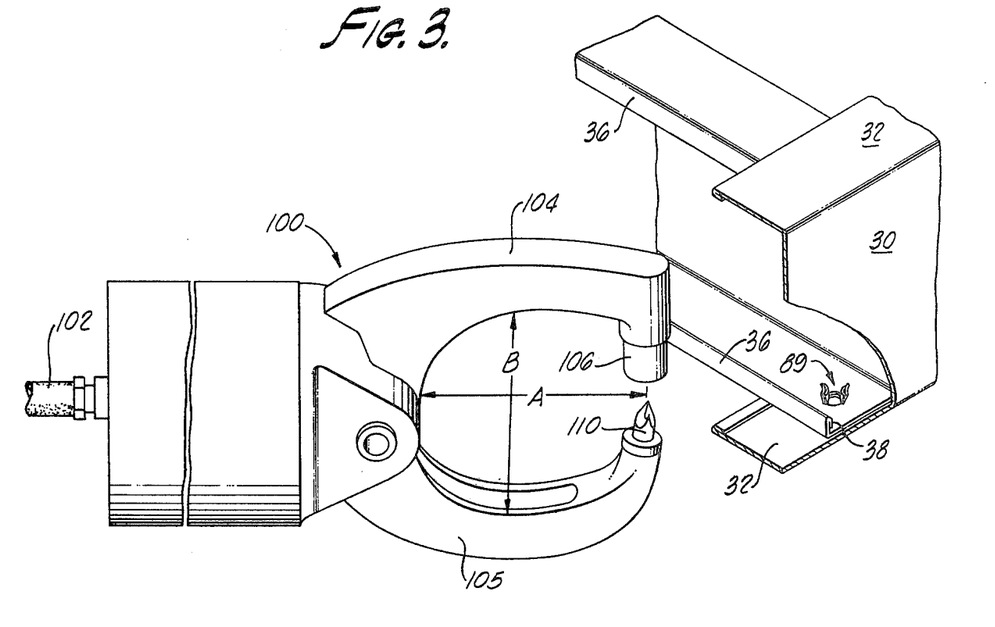
FIG. 3 is a perspective view showing a poweractuated hand tool and a crimp joint that is produced by the tool.

As shown in FIG. 2, a series of parallel channeled studs 25 are secured vertically between the cap member 20 and the floor track member 22 every 16 or 24 inches. In this invention, they are secured together by special crimps at their intersections (see, for example, FIGS. 3 and 6-11). In the best mode of practicing this invention, studs 25 are C-shaped channeled members as shown in FIGS. 3 and 12, each of which has a main web 34 and relatively narrow flanges 35 extending longitudinally of and integral with the main web 34.

Figure 12:
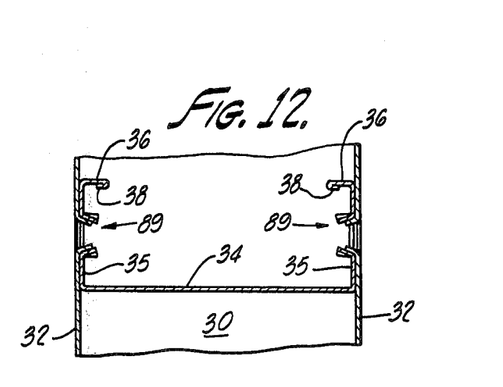
FIG. 12 is a sectional view taken along the line 12—12 of FIG. 11.

In the illustrated embodiment of the invention, studs 25 are also provided with inwardly projecting stiffening flange lips 36 and returns 38 extending along the length of and integral with flanges 35 (see FIG. 12). It is common practice to attach wallboard W and the like to flanges 35 of studs 25 by means of screws 19 passing through the flanges 35 (see FIG. 2). Stiffening lips 36 and returns 38 provide structural strength to studs 25 and also provide rigidity to flanges 35 so that they will not bend inwardly towards each other when subjected to the force of the screws 19 when wallboard W is screwed to the studs 25.

Top plates 40 and 41 in the form of 2×4 wooden members are secured to the upper cap web 26 by nails or the like. The lower top plates 40 typically extend continuously from one end of cap member 20 to the other. Upper top plate 41 usually terminates short of the ends of the wall section module. This allows the wall section modules to be secured together easily at the construction site by nailing additional 2×4 wooden members to the lower top plates 40 between the ends of the upper top plates 41 of two adjacent wall section modules.

Studs 25 have rows of apertures 42 spaced longitudinally along the length of the main web 34. These apertures 42 are provided to allow for the convenient passage of electrical conduits, structural members, and the like (not shown) through the studs 25.

Wall section module 16 has an aperture or window 50 formed in the wall section module. The window 50 is defined by an uninterrupted weight-bearing stud 52 on each side of the window, by a lintel 54 across the top of the window, and by a sill 56 across the bottom of the window. An uninterrupted stud 52 is one which extends continuously between the cap member 20 and the floor track member 22.

The lintel 54 and sill 56 are U-shaped channeled sheet metal members having upwardly and downwardly extending side flanges respectively. The lintel 54 and the sill 56 are secured to the flanges of the studs 52 on either side of the window 50 by screws 57 or the like.

Upper cripples 58 and lower cripples 60 are shortened studs which have been fitted and secured by screws 57 between the cap 20 and the lintel 54 and between the sill 56 and floor track member 22 respectively.

A header 62 is secured over the window 50. The webs of the upper cripples 58 are cut away at their upper ends in order to receive the header 62. The header 62 consists of a pair of inwardly facing mutually confronting U-shaped channeled members of 20-guage steel or the like. The header 62 is typically about 8 inches in height. The top of the header 62 is welded flush with the top of the studs 52 so that the header will support the web 26 of the cap member 20 when installed.

As shown in FIG. 2, wooden 2×4 surrounds 78 are secured to the inside of the uninterrupted studs 52 on each side of the window aperture 50, to the bottom of the lintel 54, and to the top of the sill 56 by nails. Surrounds 78 provide for the ready installation of jambs and the like for window 50.

It is also contemplated that the joints in the frame members immediately adjacent window openings and door will be made with sheet metal screws in a well-known manner. Thus, around the window opening 50 sheet metal screws are employed for the joints that involve the studs 52 immediately adjacent the opposite sides of the window opening, lintel 54, sill 56, cripples 58, 60, and header 62.

The Crimping System

At all other junctures involving uninterrupted studs, however, special crimp joints that characterize the present invention are employed. They are of the general character of the crimp joints designated by numeral 89 in FIGS. 3–12. Thus, crimp joints 89 are employed for connecting the upper ends of the uninterrupted studs to the upper cap members 20 and the lower floor track members 22 in both the load-bearing wall section modules and the non-load-bearing wall section modules. The present invention is directed primarily to wall section modules that incorporate crimp joints 89.

In FIGS. 3–12, the crimp joint 89 interconnects two layers of metal, for example, 26-gauge galvanized steel, which two layers may be termed an outer layer 90 and an inner layer 92. At the juncture of a stud 25 with either an upper horizontal cap member 20 or a lower horizontal track member 22, the two longitudinal side flanges 35 of the stud are in face-to-face contacting relation with the two longitudinal side flanges of the horizontal member.

Figure 9:
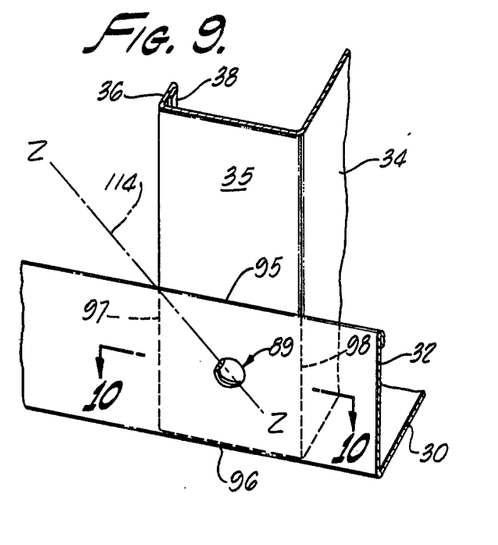
FIG. 9 is a fragmentary side elevational view showing a crimp joint at the juncture of a stud and a flange of a track member into which the lower end of the stud telescopes.
Figure 10:
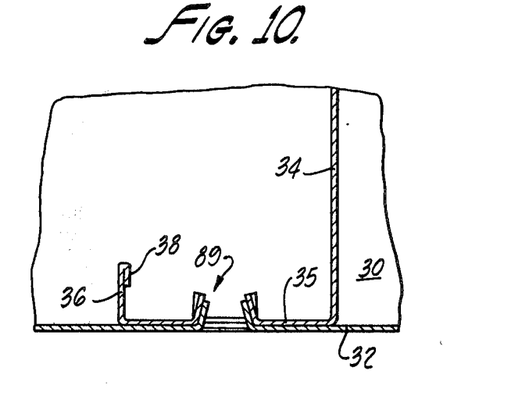
FIG. 10 is a sectional view taken along the line 10—10 of FIG. 9.

Thus, in FIGS. 9 and 10, a longitudinal side flange 35 of a stud 25 is positioned against a longitudinal side flange 32 of the lower horizontal track member 22 so that on each side of the stud there are two layers of sheet metal in contacting relationship over a rectangular area that is defined by the upper and lower edges 95 and 96, the longitudinal flange 32 of the rack member 22 and the parallel opposite edges 97 and 98 of the longitudinal side flange 30 of the stud. Thus, at each juncture of a stud 25 with the lower track member 22, there are two rectangular areas of two layers of sheet material on the opposite sides respectively of the studs, the longitudinal flange 32 of the track member being the outer layer 90 of sheet metal in FIGS. 4–10 and the longitudinal side flange 35 of the stud being the inner layer 92 of sheet metal. Each of the crimp joints 89 is located in a central portion of such a rectangle as may be seen in FIG. 9. Similar crimp joints are formed at the juncture of each stud with the cap member 20.

As indicated in FIGS. 9 and 10, in this particular embodiment of the invention, the outer edge of each longitudinal side flange 35 of each stud 25 is formed with a previously mentioned inwardly turned stiffening lip 36, the edge of which is bent back on itself to form a previously mentioned return 38 so that the edge of the stiffening lip is smooth and rounded.

Figure 4:
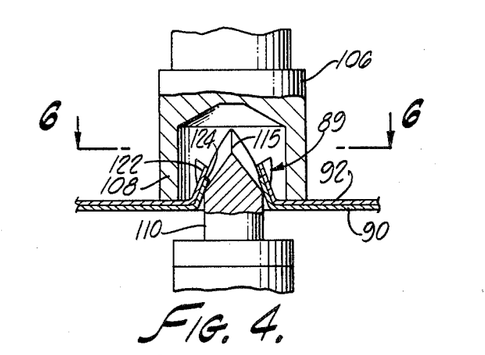
FIG. 4 is a sectional view showing how the poweractuated hand tool penetrates two layers of sheet metal to join the two layers by a crimp joint.
Figure 5:
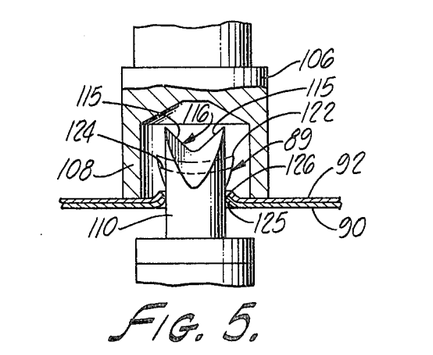
FIG. 5 is a view similar to FIG. 4 taken at 90° from the position shown in FIG. 4.
Figure 6:
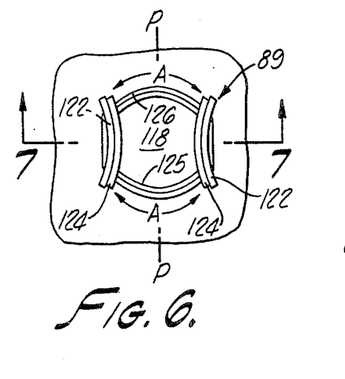
FIG. 6 is a face view of the inner side of a crimp joint as seen along the line 6—6 of FIG. 4.
Figure 7:
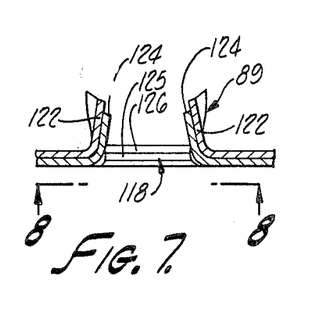
FIG. 7 is a sectional view of the crimp joint as seen along the line 7—7 of FIG. 6.
Figure 8:
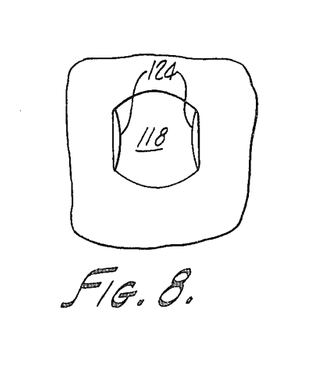
FIG. 8 is a face view of the outer side of the crimp joint as seen along the line 8—8 of FIG. 7.

The various crimp joints 89 shown in FIGS. 4–12 may be easily and almost instantaneously fabricated by means of a power-actuated hand tool of the character of the hand tool 100 in FIG. 3. The hand tool 100 which may be actuated by compressed air supplied by a hose 102 has a fixed jaw 104 and a cooperating hinged jaw 105. The fixed jaw 104 carries a hollow die, or socket, 106 which, as shown in FIGS. 4 and 5, has a cylindrical wall 108, and the hinged jaw 105 carries a cooperating punch which, as shown in FIGS. 6 and 7, comprises a punch 110. The pair of jaws has what may be termed a reach dimension designated A in FIG. 3, which is the distance that the pair of jaws may reach beyond an edge of sheet metal that the jaws straddle. The pair of jaws also has what may be termed a straddle clearance dimension B indicated in FIG. 3, which makes it possible for the pair of jaws to reach beyond an obstacle that is straddled by the jaws. The diagonal broken line 114 in FIG. 9 indicates the longitudinal axis Z—Z of the hand tool 100 at a position taken by the hand tool to reach a central portion of the rectangular layers of contacting sheets of metal to form a crimp joint 89 at one end of a stud 25, the two jaws of he tool straddling a stiffening lip 36 of the stud to make the crimp joint.

A stop (not shown) on the interior of the tool 100 limits the movement of the pivoted jaw 105 toward the stationary jaw 104, thus preventing the tines of the punch from striking the inside end of the bore of the hollow die 106.

With the hollow die or socket 106 abutting the inner layer 92 of the two layers of metal actuation of the hand tool 100 causes the punch element 110 to push through the two layers of metal to the limit position shown in FIGS. 4 and 5. The leading end of the punch element 110 has a diametrical cutting edge 116 formed by two pairs of opposite inclined surfaces 115 which converge to form the cutting edge. A pair of inclined surfaces 115 are located on each of two opposite sides of the punch. These surfaces intersect at a line that is inclined to the longitudinal axis of the punch at an angle of about 45°. The two intersecting lines themselves, corresponding respectively to each pair of inclined surfaces, intersect on the axis of the punch, thereby forming two diverging cutting edges in an diametrical plane of the punch with the points at the outer periphery of the surface of the punch. In practice, there is a very narrow curve surface at each line of the intersection. The shape of the cutting edge 116 is best shown in profile in FIG. 5.

In fabricating a crimp joint 89, the punch 110 forms two concurrent apertures 118 in the two layers of metal. These apertures have a cross-sectional area slightly greater than the cross-sectional area of the punch. When the leading edge 116 of the punch element initially penetrates the two layers of metal, the two points form two holes respectively. As the punch element continues to advance, the two layers of sheet metal tear in opposite directions as indicated by the two pairs of arrows A in FIG. 6. The result is the formation of two diametrically opposite pairs of tongues that are of arcuate cross-sectional configuration and two pairs of diametrically opposite rim flanges 125 and 126. Each pair of tongues are nested together, as shown in FIG. 6. Each pair of rim flanges are also nested together. The two opposite tonges 122 are formed by the inner sheet metal layer 92 and the other two tongues 124 are formed by the outer sheet metal layer 90. The two tongues 124 extend through the inner aperture 118 and are curved sufficiently to effectively interlock with the other two tongues 122. The initial diametrical cuts in the two layers of sheet metal form the end edges of the two pairs of tongues and the tearing of the two layers of metal in opposite directions form the side edges of the two pairs of tongues. Thus, the area of each tongue is approximately half the area of each aperture 118. The tongues 124 that extend through the aperture 118 are wedge-shaped and of hyperboloidal configuration. The importance of this configuration is that the two tongues 124 enlarge in width from their roots and extend beyond the periphery of the aperture 118 and thus interlock with each other and with the apertures in the manner of wedges. This arrangement makes it practically impossible to withdraw the tongues 124 of the outer sheet 90 through the aperture of the inner sheet 92.

As may be seen in FIGS. 6 and 7, the projection of the corners of the tongues onto the two sheets 90 and 92 lie outside the apertures and then nest snugly together, very effectively interlocking to resist relative movement of the metal sheets along their planes or pulling apart perpendicular to their planes. The forming of pairs of coaxial crimp joints on opposite sides of the studs while the studs are precompressed as described, provide a rigid structure at low cost.

The apertures so formed are not of circular configuration except along the rim flanges. The roots of the tongues have greater radii of curvature than the cylindrical punch, being nearly straight because of the bending action at the roots of the tongues. This is due to the tearing action along the sides of the tongues and the bending action at the roots of the tongue.

As will be noted by reference to FIGS. 6 and 7, the shape of the tongues in a plane PP parallel to the planes of the contacting areas of sheet metal, are somewhat hyperbolic. Furthermore, the tongues are nearly straight in such a plane near the roots of the tongues and the curvature of these sections gradually increases, that is, the radius of curvature of these sections gradually decreases, as the distance of the plane PP from the surfaces of the contacting metal sheets increases. They are also somewhat hyperbolic in a plane perpendicular to the planes of the contacting areas of the sheet metal. Thus, the tongues are of hyperboloidal configuration.

During the crimping operation, the two pairs of tongues are confined by the cylindrical wall 108 of the hollow die 106 so that at the end of the metal-forming operation the two pairs of tongues are more nearly perpendicular to than parallel with the planes of the two layers of metal. As will be noted in FIGS. 4 and 7, the root portions of the two pairs of tongues are bent with rather small radii of curvature. Nevertheless, the metal of the two pairs of tongues are not subjected to excessive bending stress about their roots and this fact partly accounts for the strength of the finished crimp joint. It has been found, moreover, that with the wall section modules made of galvanized sheet steel, for example, 16-gauge sheet steel, the non-corrosive coatings of the two layers of metal readily stretch or contract to smoothly follow the bending of the two tongues and thus generally remain unbroken to continue to protect the surfaces of the sheet metal at the roots of the tongues.

Figure 11:
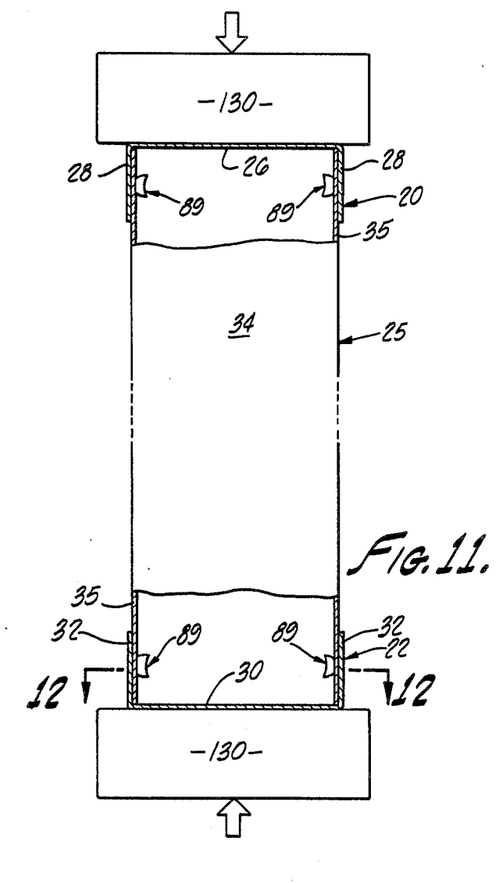
FIG. 11 is a broken away sectional view illustrating the manner in which the structure of a prefabricated wall module is preloaded at the upper and lower ends of a stud while the crimp joints are being formed.

In the best mode of practicing the invention, the edges at the opposite ends of the studs 25 are formed accurately perpendicular to the length of the stud to permit the upper end of the stud to make snug abutment against the main web 26 of the cap member 20 and to permit the lower end of the stud to make snug abutment with the main web 30 of the track member 22. In the practice of the invention, a pair of pressure members 130 indicated diagrammatically in FIG. 11 cooperate to place a stud under substantial longitudinal compression between the upper cap member 20 and the lower cap member 22 at the time that the four crimp joints 89 — two at the top and two at the bottom, as illustrated in FIG. 11 — are fabricated to anchor the studs in assembled position. The two pressure members 130 cooperate to place the stud 25 under longitudinal compression of substantial magnitude to press the opposite ends of the stud into pressure contact with the main webs 26 and 30 of the cap member 20 and the track member 22 respectively. When the sheet metal wall structure is released from the two pressure members 130 after the four crimp joints are fabricated, the major intermediate longitudinal portion of the stud recovers from compression but the two pairs of crimp joints prevent recovery of the two opposite end portions of the stud from compression. Consequently, the two opposite ends of the stud remain preloaded, with residual local longitudinal compression of each end of the studs opposed by corresponding coextensive local tension in the associate side flanges of the upper and lower horizontal members 20, 22.

The preloading of a sheet metal wall section module in this manner lends preliminary stiffness to the wall module that is more than adequate to maintain the desired assembled configuration of the wall module in the course of transporting and otherwise handling the prefabricated wall module and during maneuvering of the wall module into assembled position to form a portion of a wall at the building site. The subsequent addition of skins in the form of wallboard or the like to opposite faces of the prefabricated wall module provides the final degree of stiffness that is required in the finished wall structure. The fact that the studs are held snugly by preloading against the horizontal cap member and track member makes it unnecessary for the crimp tongues themselves to support any of the load. For this reason, the crimps need only be sufficiently strong to permit the prefabricated modules to be carried from a prefabrication station to the construction site where the modules are assembled to form walls of a house or similar structure.

The invention may be practiced with studs 25 of other non-planar configuration. For example, they may be U-shaped instead of C-shaped in cross section, that is, the stiffening flanges 36 may be omitted. The studs 25 may also be Z-shaped in cross section with parallel opposite side flanges.

Figure 13:
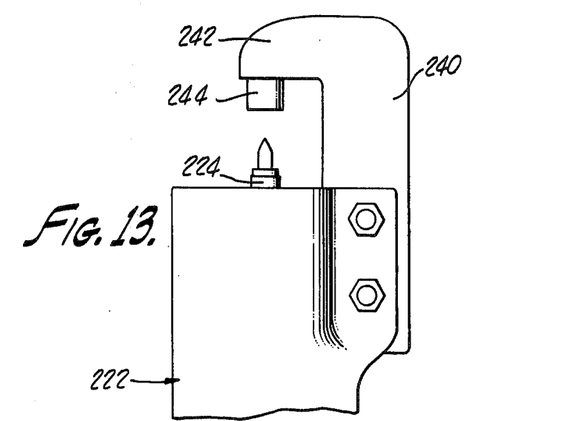
FIG. 13 is an elevational view of another form of tool that has been employed to form crimped joints in this invention.

FIG. 13 shows an alternative tool which has been employed for making crimped junctures in accordance with this invention. Thi tool employs a so-called pressure cylinder 222 which has a piston (not shown) within it connected to a shaft 24 having a punch at the outer end thereof and movable coaxially with the cylinder by manipulation of air under pressure through the two passages that communicate with cavities within the cylinder on opposite sides of the piston. A yoke 240 on one end of the cylinder has an arm 242 which supports a hollow die 244 coaxially with the cylinder and consequently coaxially with the punch. In operation when the hollow die and punch are located on opposite sides of a pair of sheet metal members arranged as in FIGS. 3 and 9, the manipulation of air pressure in the cylinder causes the punch to pierce the overlapping areas of sheet metal and to enter the die to form a crimped joint as described hereinabove. While this type of tool can be employed to form crimp joints of the type described, it is cumbersome and awkward to use and hence not as suitable as the pneumatic riveter type structure previously described in connection with FIG. 3.

The invention may be practiced in many ways other than those specifically described, all within the scope of the appended claims.

The invention claimed is:

1. In a sheet metal framework for a wall of a building having:
   an upper horizontal cap member having a main web and two opposite dependent longitudinal side flanges;
   a lower horizontal track member having a main web and two opposite upstanding longitudinal side flanges; and
   a plurality of horizontally spaced upright studs having main webs and opposite longitudinal side flanges;
   wherein the upper and lower ends of the studs telescope into the upper and lower horizontal member respectively with the side flanges of the upper and lower horizontal members overlapping the side flanges of the studs to provide areas of two layers of sheet metal,
   the improvement wherein:
   the overlapping side flanges are interconnected by crimp joints, each crimp joint being characterized by a pair of concurrent nearly circular apertures in the respective layers of metal with separate cross-sectionally curved tongues of the two layers being disposed in overlapping relation to one another at spaced-apart arcs at the edges of the concurrent apertures, the pair of overlapping tongues adjacent each of said aperture edges extending away from the planes of said apertures in a direction transverse to said layers of sheet metal, the cross-sections of said overlapping tongues being similarly curved in each plane parallel to said layers of sheet metal to inhibit movement of said overlapping tongues relative to one another in the directions of their extension thereby to resist separation of the two layers.

2. An improvement as set forth in claim 1 in which the tongues of the outer layer flare in width and engage the rim of the aperture of the inner layer with a wedging action to resist separation of the two layers.

3. In a sheet metal framework for a wall of a building as set forth in claim 1 wherein:
   said tongues have corners that have projections onto the planes of said metal layers that lie outside said apertures.

4. In a sheet metal framework for a wall of a building as set forth in claim 1 wherein:
   said studs are compressed against the web of said cap member and the web of said track member.

5. In a sheet metal framework for a wall of a building as set forth in claim 4 wherein:
   said overlapping side flanges are compressed together by said interlocking tongues.

6. In a sheet metal framework for a wall of a building as set forth in claim 1 wherein:
   said tongues comprise substantially all of the metal of said layers formerly filling said apertures.

7. In a sheet metal framework for a wall of a building as set forth in claim 1 wherein:
   the cross-sections of said tongues in a plane substantially parallel to said overlapping side flanges, are of outwardly concave generally hyperbolic configuration.

8. In a sheet metal framework for a wall of a building as set forth in claim 1 wherein:
   the tongues of each crimp joint extend toward the opposite overlapping side flanges of the same stud.

9. The improvement of claim 1 wherein the radii of curvature of said tongue cross sections in successive different ones of said parallel planes decrease with increasing distance of the tongue cross sections from said layers of sheet metal.

10. A sheet metal structure comprising:
    first and second elongated metallic members each of U-shaped cross section, each of said members having an elongated base portion integral with a pair of elongated flange portions extending in parallel relation to one another from opposing edges of said base portion, said first and second elongated members being positioned at right angles to one another with one end of said first elongated member being diposed between the spaced flange portions of said second member and with the flange portions of said first member adjacent said one end being disposed in closely adjacent parallel overlapping relation to the flange portions of said second member, whereby substantially rectangular overlap areas are formed between each flange portion of said first member and an adjacent flange portion of said second member, and
    means for locking said first and second members to one another comprising a crimp joint disposed adjacent the center of each of said substantially rectangular overlap areas, each said crimp joint comprising a pair of aligned apertures in said overlapping flange portions respectively, a pair of spaced tongues integral respectively with opposed edges of the aperture in the overlapping flange portion of said second member extending through the aperture in the overlapped flange portion of said first member, said pair of tongues being arcuately curved in cross section, a further pair of tongues having a similar arcuate curvature in cross section integral respectively with opposed edges of the aperture in the overlapped flange portion of said first member, said two pairs of curved tongues extending in directions transverse to and inward of said overlapping and overlapped flange portions respectively into the region between the spaced flange portions of said second member, said pairs of tongues being disposed in intimate nested relation to one another respectively, the projection on said overlap areas of the corners of said tongues remote from said apertures lying outside said apertures.

11. The structure of claim 10 wherein the roots of said nested pairs of tongues are located on a line extending transverse to the direction of elongation of both said first and second members.

12. A sheet metal structure comprising:

first and second elongated metallic members each of U-shaped cross-section, each of said members having an elongated base portion integral with a pair of elongated flange portions extending in parallel relation to one another from opposing edges of said base portion, said first and second elongated members being positioned in transverse relation to one another with one end of said first elongated member being disposed between the spaced flange portions of said second member in forcible engagement with the base portion of said second member and with the flange portions of said first member adjacent said one end being disposed in closely adjacent parallel overlapping relation to the flange portions of said second member, whereby overlap areas are formed between each flange portion of said first member and adjacent flange portions of said second member, and means for locking said first and second members to one another comprising a crimp joint disposed adjacent the center of each of said overlap areas, each said crimp joint comprising a pair of aligned apertures in said overlapping flange portions respectively, a pair of spaced tongues integral respectively with opposed edges of the aperture in the overlapping flange portion of said second member extending through the aperture in the overlapped flange portion of said first member transversely of said flange portions, said pair of tongues being outwardly concave in cross-section, the curvature of said cross section being different in different planes parallel to said overlap areas, a further pair of tongues having a similar outwardly concave and varying curvature cross-section integral respectively with opposed edges of the aperture in the overlapped flange portion of said first member, said further pair of tongues also extending transversely of said flange portions, said two pairs of tongues being disposed in intimate nested relation to one another respectively.

* * * * *